United States Patent [19]

Kramer

[11] 3,941,481
[45] Mar. 2, 1976

[54] RING LASER HAVING ELASTIC WAVE BIAS

[76] Inventor: Charles John Kramer, 84 Deer Creek Road, Pittsford, N.Y. 14534

[22] Filed: Mar. 15, 1974

[21] Appl. No.: 451,765

[52] U.S. Cl. .......................................... 356/106 LR
[51] Int. Cl.² .......................................... G01B 9/02
[58] Field of Search ............................... 356/106 LR

[56] References Cited
UNITED STATES PATENTS

| | | | |
|---|---|---|---|
| 3,345,909 | 10/1967 | De Maria | 356/106 LR |
| 3,508,831 | 4/1970 | Macek | 356/106 LR |
| 3,791,738 | 2/1974 | Newburgh | 356/106 LR |

OTHER PUBLICATIONS

"Acoustic Wave ... Ring Laser"; Buholz et al; IEEE Jr. of Qunntum Electronics; Vol. QE3; 11; Nov. 67; pp. 454–459.

*Primary Examiner*—Vincent P. McGraw

[57] ABSTRACT

A ring laser having beams traveling in opposite directions and elastic wave biasing means in the form of an element of elasto-optic material through which the beams pass in a common optical path. Beam coupling is reduced by applying elastic waves to the element such that particles of the elastic material vibrate along the common optical path.

10 Claims, 2 Drawing Figures

RING LASER HAVING ELASTIC WAVE BIAS

BACKGROUND OF THE INVENTION

1. Field of the Invention

The invention relates to ring lasers and more particularly to internally biasing ring lasers.

2. Description of the Prior Art.

A ring laser essentially consists of a polygonal array of mirrors, which are arranged to enclose an area and form a resonant cavity which includes a gain medium. This resonant cavity has two oppositely traveling resonant light fields that traverse the same path and oscillate at frequencies which are determined by the optical path lengths they travel. Effects which are measured using ring lasers cause differences in the optical path lengths of the oppositely traveling beams which results in a frequency difference between the beams. By monitoring this frequency difference the magnitude and direction of the effect are determined. A number of applications for which ring lasers have been used are: as gyros having no moving parts and unaffected by acceleration or orientation; as highly sensitive and accurate fluid flow meters; and in devices for studying changes in the refractive index of materials.

Heretofore ring lasers have experienced beam coupling when the difference in beam frequencies was below a certain lock-in frequency. At frequency differences below the lock-in level the frequencies would spontaneously coincide. This was caused principally by energy exchange between light in one beam and back scattered light from the other beam, and also by competition effects within the lasing medium. These effects precluded the use of ring lasers at frequency differences below the lock-in frequency.

Energy exchange is generally considered to be caused by back scattered light from one beam reinforcing the other beam when the frequencies of the two beams are nearly equal. See M. Bass, H. Stotz, and G. A. DeMars, J. Appld. Phys., vol. 39, p. 4015–4018, July, 1968. Practical limitations seem to prevent total elimination of back scatter; therefore, in the prior art a frequency bias was used to separate the frequencies of the two beams to prevent beam coupling. The use of a frequency bias also reduced mode competition effects within the laser medium.

Various bias techniques have been used with varying success to overcome this beam coupling phenomenon. See J. Kilpatrick, IEEE Spectrum, vol. 4, p. 44–55, Oct. 1967. Some of the prior biasing techniques utilized an elasto-optic diffraction element as part of the ring laser cavity. These elements were used to either amplitude modulate the intensity of the oppositely traveling beams or to produce a frequency difference between the beams by Brillouin scattering.

SUMMARY OF THE INVENTION

A ring laser, according to the present invention, has an element of elasto-optic material forming part of the optical beam path of the ring laser cavity and force generating means for causing vibration of the particles of the elasto-optic element in such a fashion that the vibratory motion has a component along the optical path of the beams. For example, the elasto-optic element may be a transparent isotropic solid, such as fused quartz, and the force generating means may be a piezoelectric crystal fixed to said element, and electrically energizable such as to set up ultrasonic transverse waves in the element. The transverse waves are directed so as to intersect said optical path and to cause particles of said element to vibrate such as to have a component of motion along said optical path at the ultrasonic frequency. This component of motion along said optical path causes a difference in the optical path lengths of the oppositely propagating beams, by the Fresnel drag effect, which results in a frequency difference between the beams. Since the particle motion is of vibratory form, the frequency difference alternates at the ultrasonic frequency and the ring laser is biased out of the lock-in region most of the time.

The invention, as summarized above, fulfills various objects of utility to various arts such as measuring, testing, navigation, and so on.

Thus one object of the invention is to provide a ring laser which operates at small frequency differences.

Again, another object of the invention is to provide a ring laser which is substantially free of beam coupling.

Still other objects of the invention will become apparent from the following detailed description of my invention.

DESCRIPTION OF THE PREFERRED EMBODIMENTS

Figure 1:
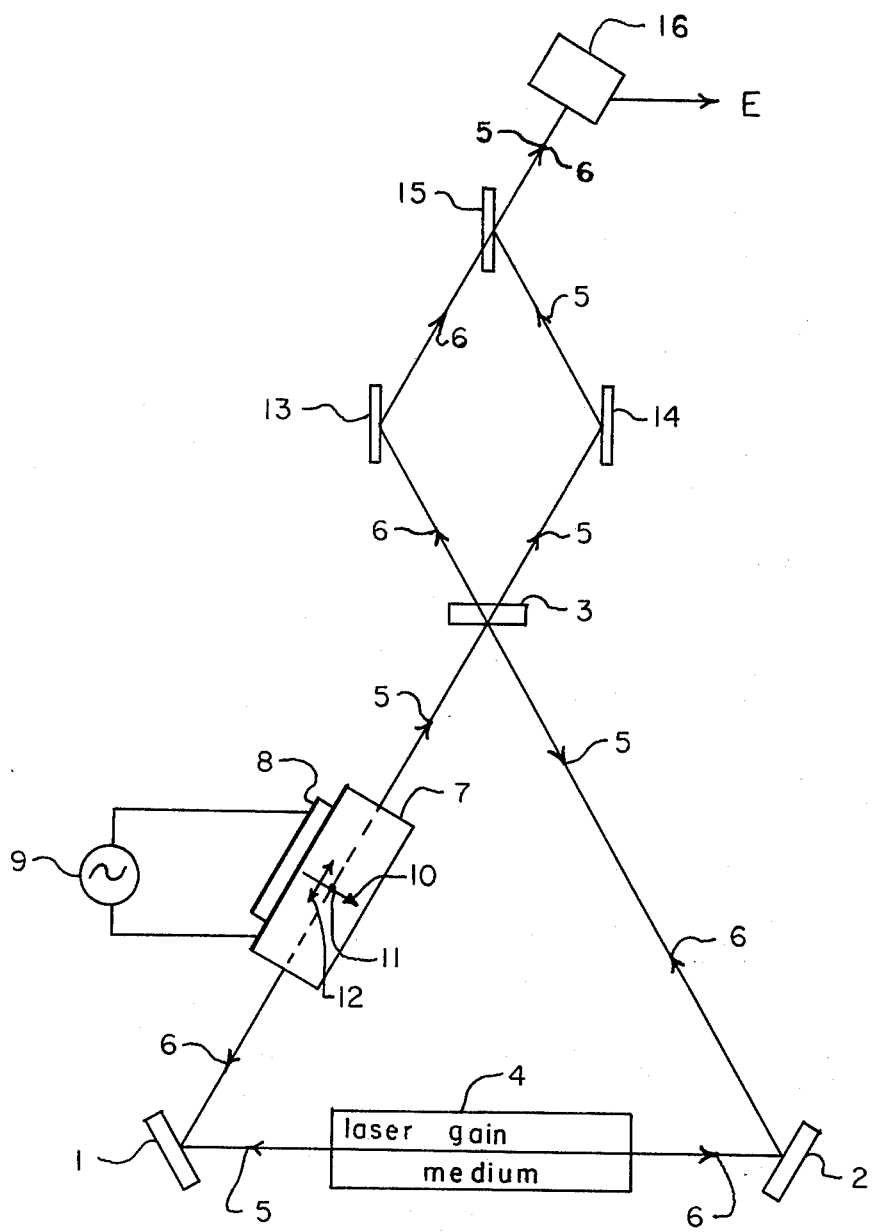
FIG. 1 is a schematic diagram of a ring laser in accordance with my invention.

In FIG. 1, a typical ring laser is shown in simplified fashion, as mirrors 1, 2, 3, and laser gain medium 4. A clockwise (CW) beam 5 and a counterclockwise (CCW) beam 6 are generated and amplified by the laser gain medium 4 and traverse the same path in opposite directions about the closed triangular cavity defined by mirrors 1, 2, and 3.

According to my invention, the ring laser cavity also includes elasto-optic element 7, through which the CW and CCW beams pass. Because the beams are coincident, they encounter the same particles of element 7. If the particles of element 7 move so that the net effect is of particle motion in the direction of propagation of only one of the beams, then there will be a difference between the optical path lengths of the beams due to the Fresnel drag effect, notwithstanding the apparent geometric identity between the CW and CCW paths. Because the frequency of each beam is a function of its optical path length, the above described particle motion can be used to create a frequency difference between the CW and CCW beams of the ring laser.

This particle motion naturally cannot continue indefinitely in one net direction, so my invention provides for creating the motion in vibratory form, that is to say, such that it alternates in direction. Thus, consider element 8 to be an ultrasonic transverse wave transducer fixed to the side of element 7, as, for example, a piezoelectric crystal having electrodes on opposite faces for applying an alternating voltage to element 8 from a source 9.

In the simplest case, the source 9 would apply a voltage to transducer 8, say at an "ultrasonic" frequency that would cause transverse waves to propagate through element 7 in the direction indicated by the arrow 10, which is shown as perpendicularly intersecting that part of the beams' path which is within element 7 (and which is shown as a dashed line within element 7). The direction of particle polarization of the transverse wave is indicated by double-headed arrow 12, the direction of which is parallel to the beams' path. If we now imagine that at the intersection of the beams' path and the transverse wave there is a particle 11 of element 7, then this particle will move back and forth along the beams' path.

It is to be understood that the directions indicated by arrows 10 and 12 are not crucial specifications for the transverse wave. What is crucial is that whatever may be the specifications for the transverse wave, they must be such that the motion it imparts to particle 11 has a vibratory component in the direction indicated by the arrow 12. As a matter of fact, this means that the wave need not be "transverse", namely, it could be longitudinal, provided it excites motions of particle 11 having a vibratory component in the direction indicated by arrow 12.

In other words, I am not concerned with the character of the energy injected into the element 7, nor with such energy's directional sense, and so on, but with whether these things are such that there is a component of particle motion in accordance with arrow 12. More precisely, the path of the beams in element 7 has a finite, more or less definite cross section. What is necessary is that the particles of this cross section have a net back and forth motion along the path, which motion is "seen" by the beams.

It is known from classical electrodynamics that the velocity of light in a medium is a function of the medium's velocity. See W. D. Jackson, *Classical Electrodynamics*, New York: John Wiley & Sons, Inc., 1962, p. 362. The optical path length of an element is determined by the velocity of light in the element and therefore is a function of the velocity of the medium that comprises the element. The frequency difference $\Delta\nu$ generated between the CW and CCW beams by a particle motion in element 7 due to the Fresnel drag effect is;

$$\Delta\nu \simeq \frac{2|v|d}{\lambda L}[n^2 - 1] \quad (1)$$

where $|v|$ is the absolute value of the component of particle velocity in the direction of propagation of the light beams (namely, the direction indicated by arrow 12), $d$ is the length of the path of the light beams in the moving medium of element 7, $\lambda$ is the wavelength of the ring laser resonant frequency, L is the optical path length of the ring laser cavity, and $n$ is the refractive index of element 7.

If the particle motion of element 7 is caused by an ultrasonic wave, the particle velocity v is related to the ultrasonic frequency $\Omega$ by:

$$V = \psi\Omega \text{ SIN } \Omega t \quad (2)$$

where $\psi$ is the amplitude of the ultrasonic wave. In particular for $n = 1.47$, $d = 4$ cm, $\lambda = 1\mu M$, L = 100 cm, $\Omega = 1.1 \times 10^6$ radian/second, and $\psi = 10^{-2}\mu M$, the maximum frequency difference is about $10^3$ Hz, which is substantially 10 times the lock-in frequency for typical ring lasers.

The $10^3$ Hz frequency difference is an alternating peak value, that is to say the bias varies sinusoidally from $10^3$ Hz to $-10^3$ Hz. This alternating bias produces an input rate such that the ring laser is biased out of the lock-in region most of the time.

Mirror 3, of the ring laser in FIG. 1, is somewhat transparent so that a portion of the CW and CCW beams can pass through. A pair of mirrors 13 and 14 are arranged to receive light from the CCW and CW beams respectively and to reflect the light to a semitransparent mirror 15, where the beams are combined and directed to a photodetector array 16. Photodetector array 16 receives the beams and in response provides an output signal E which is used to determine the dynamic phase shift between the two beams per unit time. If the signal E is time averaged over one period of the ultrasonic wave, the phase shift due to the alternating bias will average to zero, while the phase shift due to a relatively continuous rotation of the ring laser about an axis perpendicular to a plane formed by the beam paths will appear in the average output signal E.

It is desirable that the laser beams have the same phase across their diameters. Thus, when biasing by propagating an ultrasonic transverse wave perpendicular to the beam path, it is desirable that the ultrasonic wave length be at least twice the diameter of the laser beam width in the element 7.

Figure 2:
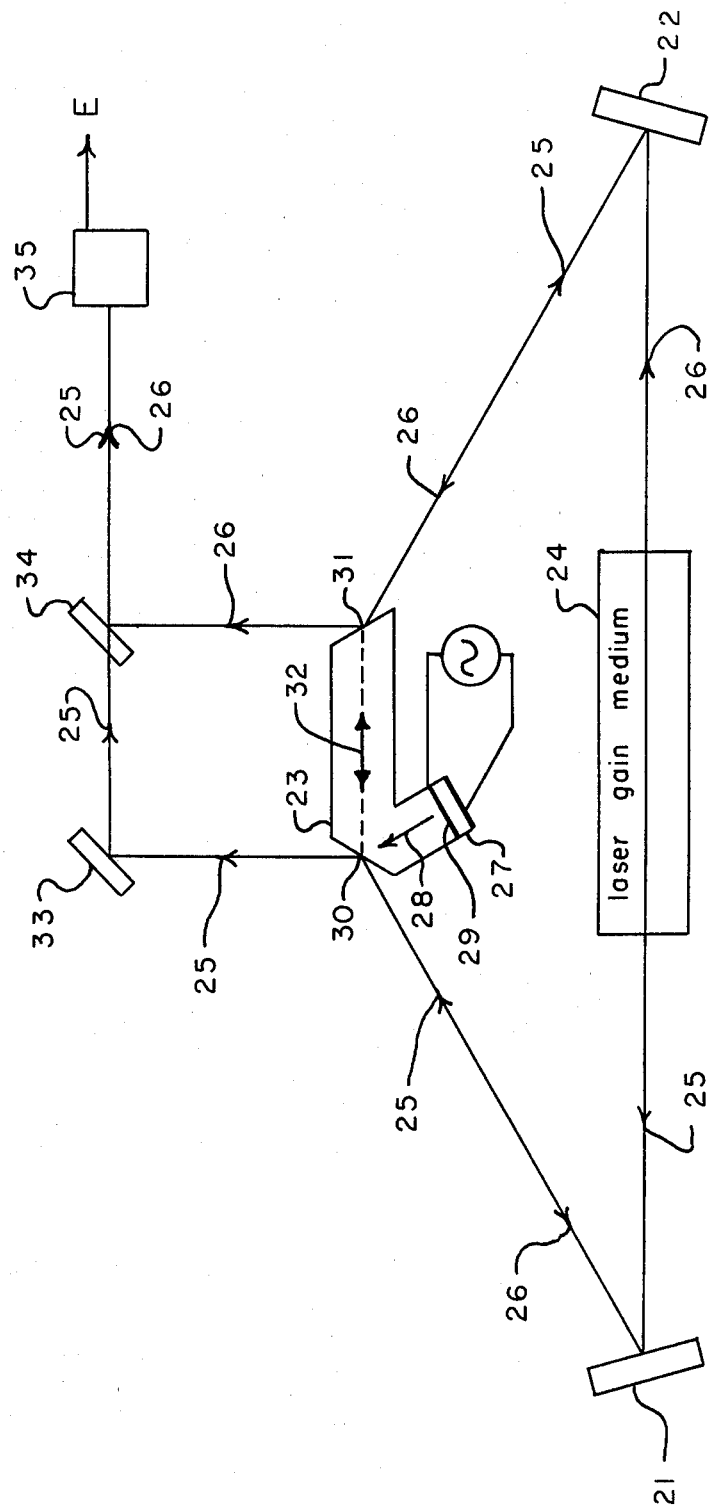
FIG. 2 shows a modification of the ring laser of FIG. 1.

In FIG. 2 is shown an embodiment of my invention wherein the ring laser comprises mirrors 21 and 22, prism 23, and laser gain medium 24. A CW beam 25 and a CCW beam 26 are generated and amplified by the laser gain medium and traverse the same path in opposite directions about the closed semitriangular cavity defined by mirrors 21 and 22 and the dashed line in prism 23.

In this form of my invention, prism 23 not only acts as a beam steering element of the cavity, but also as an elasto-optic element to which ultrasonic waves can be applied by the ultrasonic wave transducer 27, fixed to the side 29 of the prism. Transducer 27 consists of a piezoelectric crystal with electrodes on opposite faces for applying an alternating voltage to the crystal from a voltage source. In the simplest case, the source applies a voltage to transducer 27 at an ultrasonic frequency which causes longitudinal ultrasonic waves to propagate in the direction indicated by arrow 28. These longitudinal waves strike the inner side of surface 30 of prism 23 and are reflected so that after reflection longitudinal waves propagate to the inner side of surface 31 along a path which is colinear with the light beams' propagation path in prism 23. Since the particle motion associated with a longitudinal wave is in the direction of propagation of the wave, the reflected longitudinal waves induce the particles of prism 23 to have a component of motion in the direction indicated by double-headed arrow 32. As in the device of FIG. 1, this component of particle motion induced by the longitudinal waves along the light beams' path in prism 23 produces an alternating frequency difference between the beams by the Fresnel drag effect, and can be used to bias the ring laser out of the lock-in region most of the time. Desirably, but not necessarily, the wave length should be at least twice the length of the beam path in the prism.

Surfaces 30 and 31 of prism 23 are somewhat reflective for the ring laser radiation so that a portion of the CW and CCW beams are directed to mirror 33 and to semitransparent mirror 34 respectively. Light from the CW beam is reflected from mirror 33 to semitransparent mirror 34 where it is combined with light from the CCW beam and directed to photodetector array 35, which in response provides an output signal E which is used to determine the dynamic phase shift between the beams per unit time.

It is to be understood that I do not use the term "optical" to refer just to radiation visible to the human eye. Rather, the term is to be understood as referring to the entire electromagnetic spectrum. Also, "acoustic" is to be taken to refer to elastic waves generally, not merely to those audible to the human ear.

As is well known, particle motion in a given direction can be caused by elastic waves in various modes of propagation known as transverse, longitudinal, and surface waves. In addition, it is possible to cause the same physical device to generate more than one of these modes, selectively, and as well, it is also possible to convert one mode to another, as by reflecting, refracting, and so forth. It is therefore evident that my invention as described and claimed herein, is in no way dependant on any particular means for producing elastic waves, nor does it depend on the manner in which such means is used to produce elastic waves.

Having described my invention in accordance with the requirements of 35 U.S.C. 112, I claim:

1. A ring laser comprising, in combination,
    first means providing a closed optical path;
    second means for providing two laser beams traversing said path coincidently and simultaneously, but in opposing directions;
    third means providing bias of the frequencies of the beams for preventing said beams from becoming coupled together;
    said third means including an element of elastic material through which said path passes, wherein particles of said material define part of said path; and force generating means for causing said particles periodically to move elastically in one of said directions, substantially in phase, for increasing the frequency of one of said beams and decreasing the frequency of the other of said beams, by virtue of Fresnel drag.

2. The ring laser of claim 1 wherein the said force generating means is also for causing said particles periodically to move elastically in the other of said directions, for decreasing the frequency of the said one of said beams and for increasing the frequency of the said other of said beams.

3. The ring laser of claim 1, wherein said force generating means is a wave generator coupled to said element for propagating transverse waves across said part of said path for causing said particles to move as aforesaid.

4. The ring laser of claim 1, wherein said force generating means is a wave generator coupled to said element for propagating longitudinal waves along said part of said path for causing said particles to move as aforesaid.

5. The ring laser of claim 1, including fourth means for extracting, from said closed path, a portion of the energy in each of said beams for providing a measure of the difference between the frequencies of said beams.

6. The ring laser of claim 5, wherein the force generating means is also for causing said particles periodically to move elastically in the other of said directions, for decreasing the frequency of the said one of said beams and for increasing the frequency of the said other of said beams.

7. The ring laser of claim 5, wherein said force generating means is a wave generator coupled to said element for propagating transverse waves across said part of said path for causing said particles to move as aforesaid.

8. The ring laser of claim 5, wherein said force generating means is a wave generator coupled to said element for propagating longitudinal waves along said part of said path for causing said particles to move as aforesaid.

9. The ring laser of claim 5, wherein said fourth means includes a prism having first, second, and third surfaces, said first surface being oriented for directing longitudinal waves to the inner side of said second surface, and said second and third surfaces being oriented so that light propagated in said prism and between the inner sides thereof, emerges from said prism directed along said path; said force generating means being coupled to said first surface for propagating said longitudinal waves.

10. The ring laser of claim 9, wherein the said force generating means is also for causing said particles periodically to move elastically in the other of said directions, for decreasing the frequency of the said one of said beams and for increasing the frequency of the said other of said beams.

* * * * *